United States Patent [19]
Staker et al.

[11] Patent Number: 5,629,801
[45] Date of Patent: May 13, 1997

[54] DIFFRACTION GRATING LIGHT DOUBLING COLLECTION SYSTEM

[75] Inventors: Bryan P. Staker, Palo Alto; David M. Bloom, Portola Valley; Bryan E. Loucks, Los Altos Hills, all of Calif.

[73] Assignee: Silicon Light Machines, Sunnyvale, Calif.

[21] Appl. No.: 473,759

[22] Filed: Jun. 7, 1995

[51] Int. Cl.⁶ .............. G02B 5/18; G02F 1/03; G02F 1/00; G03B 21/14

[52] U.S. Cl. .............. 359/572; 359/558; 359/263; 353/82; 353/122; 348/759; 349/5

[58] Field of Search .............. 359/40, 45, 558, 359/572, 263; 353/122, 82; 348/759

[56] References Cited

U.S. PATENT DOCUMENTS

| | | | |
|---|---|---|---|
| 3,947,105 | 3/1976 | Smith | 353/121 |
| 4,009,939 | 3/1977 | Okano | 350/162 SF |
| 4,017,158 | 4/1977 | Booth | 350/162 SF |
| 4,067,129 | 1/1978 | Abramson et al. | 40/563 |
| 4,093,346 | 6/1978 | Nishino et al. | 350/162 SF |
| 4,139,257 | 2/1979 | Matsumoto | 350/6.1 |
| 4,163,570 | 8/1979 | Greenaway | 283/8 A |
| 4,184,700 | 1/1980 | Greenaway | 283/6 |
| 4,211,918 | 7/1980 | Nyfeler et al. | 235/454 |
| 4,223,050 | 9/1980 | Nyfeler et al. | 427/163 |
| 4,250,217 | 2/1981 | Greenaway | 428/161 |
| 4,250,393 | 2/1981 | Greenaway | 250/566 |
| 4,408,884 | 10/1983 | Kleinknecht et al. | 356/355 |
| 4,440,839 | 4/1984 | Mottier | 430/2 |
| 4,492,435 | 1/1985 | Banton et al. | 350/360 |
| 4,556,378 | 12/1985 | Nyfeler et al. | 425/143 |
| 4,596,992 | 6/1986 | Hornbeck | 346/76 PH |
| 4,655,539 | 4/1987 | Caulfield et al. | 350/3.6 |
| 4,751,509 | 6/1988 | Kubota et al. | 340/784 |
| 4,761,253 | 8/1988 | Antes | 264/1.3 |
| 4,856,869 | 8/1989 | Sakata et al. | 350/162.18 |
| 4,915,463 | 4/1990 | Barbee, Jr. | 350/1.1 |
| 4,984,824 | 1/1991 | Antes et al. | 283/91 |
| 5,035,473 | 7/1991 | Kuwayama et al. | 350/3.7 |
| 5,058,992 | 10/1991 | Takahashi | 359/567 |
| 5,089,903 | 2/1992 | Kuwayama et al. | 359/15 |
| 5,101,184 | 3/1992 | Antes | 235/454 |
| 5,132,812 | 7/1992 | Takahashi et al. | 359/9 |
| 5,155,604 | 10/1992 | Miekka et al. | 359/2 |
| 5,231,388 | 7/1993 | Stoltz | 340/783 |
| 5,291,317 | 3/1994 | Newswanger | 359/15 |
| 5,301,062 | 4/1994 | Takahashi et al. | 359/567 |
| 5,311,360 | 5/1994 | Bloom et al. | 359/572 |
| 5,347,433 | 9/1994 | Sedlmayr | 362/32 |
| 5,363,220 | 11/1994 | Kuwayama et al. | 359/3 |

OTHER PUBLICATIONS

R. Apte, F. Sandejas, W. Banyai, D. Bloom, "Grating Light Valves For High Resolution Displays", Ginzton Laboratories, Stanford University, Stanford, CA 94305-4085.

R. Apte, *Grating Light Valves For High Resolution Displays* Jun., 1994.

O. Solgaard, *Integrated Semiconductor Light Modulators For Fiber-Optic And Display Applications*, Feb., 1992.

J. Neff, "Two-Dimensional Spatial Light Modulators: A Tutorial", *Proceedings of the IEEE*, vol. 78, No. 5 (May 1990), pp. 826–855.

Gerhard-Multhaupt, "Viscoelastic Spatial Light Modulators and Schlieren-Optical Systems for HDTV Projection Displays", *SPIE* vol. 1255 *Large Screen Projection Displays II* (1990), pp. 69–78.

Gerhard-Multhaupt, "Light-Valve Technologies for High-Definition Television Projection Displays", *Displays*, vol. 12, No. 3/4 (1991), pp. 115–128.

*Primary Examiner*—Paul M. Dzierzynski
*Assistant Examiner*—Audrey Chang
*Attorney, Agent, or Firm*—Haverstock & Associates

[57] ABSTRACT

A reflective/diffractive light valve system collects light from multiple dimensions around a single light source. From these multiple collection dimensions, the light is directed to impinge on the valve from multiple directions. When the valve is configured to be reflective, the light returns to the source. On the other hand, when the valve is configured to be diffractive, light from a first and third order diffraction are transmitted from the valve for each of the collection dimensions which greatly enhances the efficiency of the system.

8 Claims, 3 Drawing Sheets

DIFFRACTION GRATING LIGHT DOUBLING COLLECTION SYSTEM

FIELD OF THE INVENTION

This invention relates to the field of optical systems. More particularly, this invention relates to a system which increases the amount of useful light collected from a reflective light valve system. The light is collected via multiple spherical mirror and condensing lens systems with the aid of a turning mirror system which matches the angular separation of the turning mirrors to the deflection angle of the light valve.

BACKGROUND OF THE INVENTION

In a light valve system, it is especially important to maximize the collection of light available from the source to maximize efficiency of the system and maintain a cost effective design. The cost of precision light sources such as for display systems increases dramatically with lumen intensity. Light valve systems can be categorized into transmissive and reflective systems.

In a typical transmissive system, a collecting mirror is used to collect light and transmit it through the valve. With only a collecting reflector, light is collected from only one side of the source. Light collected from collecting reflectors has a low degree of collimation. Nevertheless, a typical transmissive light valve system collects light with collecting reflectors. Such transmissive systems can collect over 55% of the light radiated from the source.

For reflective light valve systems, the requirements for light collimation are more stringent and typical systems use condensing lenses to collect light which give much better collimation. A typical reflective light valve system uses both a spherical mirror and a condensing lens or lens system so that light is collected from 2 sides of the source. However, the efficiencies of such systems are low. For example, an F/0.72 condensing system with a rear reflector collects only 18% of radiated light.

FIG. 1 demonstrates a typical diffractive light valve configuration where the source is imaged on a turning mirror. Light is radiated in all directions from a light source 100, such as a bulb. Light which strikes a spherical mirror 102 is collected and returned to the source 100 and passes thereby. Similarly, light which leaves the source 100 and strikes a condenser system 104 is also collected and focused. In the embodiment shown in FIG. 1, the condenser 104 is a composite lens system. It will be apparent to those of ordinary skill in the art that other types of lens systems can be utilized to accomplish the function of condensing. The light which was collected by the mirror 102 also enters the condenser 104 after passing the source 100. Light which neither strikes the mirror 102 nor the condenser 104 is lost. This wasted illumination accounts for lost efficiency of the system.

The condenser 104 images the light from the source 100 onto a specular turning mirror 106. The turning mirror 106 reflects the light onto a reflective light valve 108. In the embodiment shown in FIG. 1, a Schlieren lens 110 is positioned between the turning mirror 106 and the valve 108.

The valve 108 in this embodiment is a diffraction grating light valve. The valve is selectively configurable to be either reflective or diffractive. Examples of such a device are found in U.S. Pat. No. 5,311,360, issued May 10, 1994 to Bloom et al., and in co-filed, co-pending U.S. patent applications, Ser. No. 08/482,188, entitled FLAT DIFFRACTION GRATING LIGHT VALVE, and filed herewith, and in co-filed, co-pending U.S. patent application, Ser. No. 08/480,459, entitled A METHOD OF MAKING AND AN APPARATUS FOR A FLAT DIFFRACTION GRATING LIGHT VALVE and filed herewith. When configured to be reflective, the light which strikes the valve 108 is specularly reflected back to the turning mirror 106 through the lens 110 and thence to the source through the condenser 104.

When the valve is diffractive, the diffractive angle is known and calculable as a function of the period of the diffraction grating. When configured to be diffractive, the system is configured so that the deflected light bypasses the turning mirror and enters the projection optics 112. It is well known that light is diffracted through first order angle $\Theta$ and also through multiples of $\Theta$. Light which leaves the valve 108 at the second and third order diffraction angles blocked by the pupil mask 114. In this way, the desired first order light is provided to the projection optics 112.

It is required that the deflection angle of the light valve be greater than the angle subtended by the image of the source on the turning mirror to collect all of the deflected light. For large sources, this is not always possible without compromising brightness. This constrains the maximum magnification of the source on the turning mirror or requires alternative techniques to maximize brightness. These problems become pronounced for light valves that deflect light through small angles.

The Eidaphor is the oldest high-brightness reflective light valve projector. The Eidaphor utilizes a deformable oil film on a spherical mirror that is addressed with an electron beam. When addressed, the locally flat surface of the film becomes sinusoidal with a period of 40 µm. The size of the source incident on the turning mirror must be small. To achieve small turning mirror dimensions while still maximizing brightness, multiple turning mirrors are used. The light is only collected in a single dimension and direction for delivery the multiple turning mirrors. Light from a source is collected in a single dimension by a condenser lens system. The light leaving the lens system in a single direction impinges on multiple turning mirrors. By using multiple turning mirrors, the effective size of the turning mirrors when taken together as viewed from the source is increased. Correspondingly, the smaller turning mirrors allow higher order modes of diffracted light to bypass the mirrors. The light reflected by the turning mirrors passes through a splitter to impinge on the color specific deformable oil film/reflectors. Three oil film/reflectors are used to develop red, green and blue color. A lens system is used between the splitter and the oil film/reflectors. If the light is reflected, it returns to the source. If the light is diffracted, it bypasses the turning mirrors and proceeds to the projection optics. As with the embodiment of FIG. 1, a significant portion of the light generated by the source is wasted and never enters the system or impinges on the valve.

For a diffractive light valve which diffracts a small amount of undesirable light into the second order, this system has the disadvantage that second order light will be diffracted into the dark state. This is an advantage for the Eidaphor, because its dark state does not diffract light into higher orders.

SUMMARY OF THE INVENTION

A reflective/diffractive light valve system collects light from multiple dimensions around a single light source. From these multiple collection dimensions, the light is directed to impinge on the valve from multiple directions. When the valve is configured to be reflective, the light returns to the source. On the other hand, when the valve is configured to be diffractive, light from odd diffraction orders are transmitted from the valve for each of the collection dimensions which greatly enhances the efficiency of the system.

DETAILED DESCRIPTION OF THE PREFERRED EMBODIMENT

The preferred embodiment of the present invention is in a display system using a diffraction based light modulator. In this system the light valve includes an addressable array of reflective ribbon structures suspended above a substrate. The act of addressing the elements of the array causes the ribbons to selectively move toward the substrate. The amount of motion is of the ¼ center wavelength of the spectrum of incident light. When the ribbons are activated, they form a diffraction grating and behave in the conventional manner. When they are not activated, they effectively are at the plane of the continuous reflector and act like a smooth specular mirror.

Figure 2:
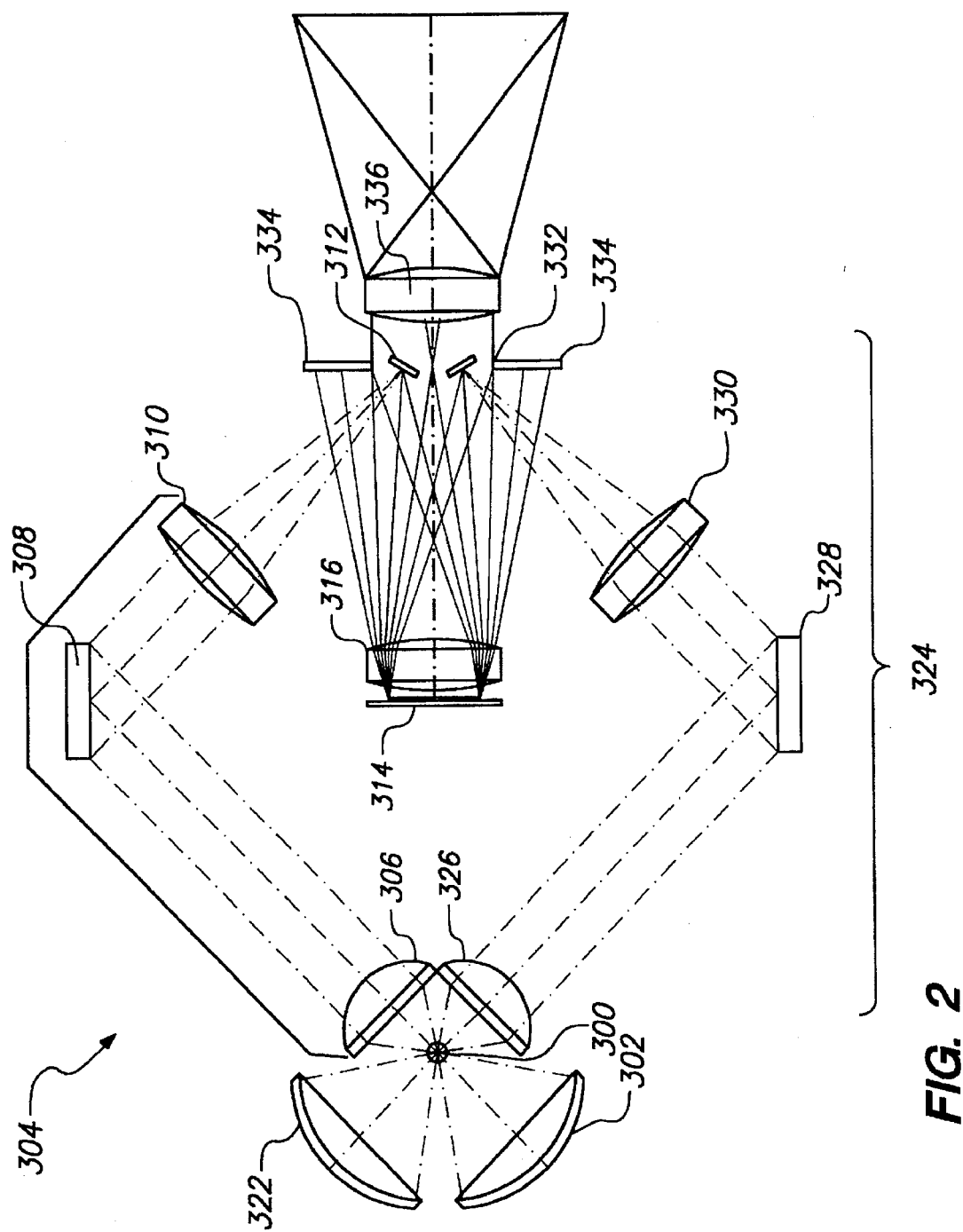
FIG. 2 shows a schematic diagram of the optical system for a reflective light valve system according to the preferred embodiment of the present invention.

FIG. 2 shows a schematic diagram of the optical system of the present invention. A single light source 300 generates light which is dispersed in all dimensions. Light is radiated in all directions from a light source 300, such as a bulb. Light which strikes a first spherical mirror 302 is collected and returned to the source 300 and passes thereby. Similarly, light which leaves the source 300 and strikes a first condenser system 304 is also collected, collimated, and imaged onto a turning mirror. In the embodiment shown in FIG. 2, the condenser 304 is a composite lens system including a first lens 306 to collimate the light, a turning mirror 308 to redirect the light and a second lens 310 to image the source 300 onto a subsequent turning mirror 312. It will be apparent to those of ordinary skill in the art that other types of lens systems can be utilized to accomplish the function of condensing. The light which was collected by the mirror 302 also enters the condenser 304 after passing the source 300.

The condenser 304 images its portion of the light from the source 300 onto a specular turning mirror 312. The turning mirror 312 reflects the light onto a reflective light valve 314. In the embodiment shown in FIG. 2, a Schlieren lens 316 is positioned between the turning mirror 312 and the valve 314.

Figure 1:
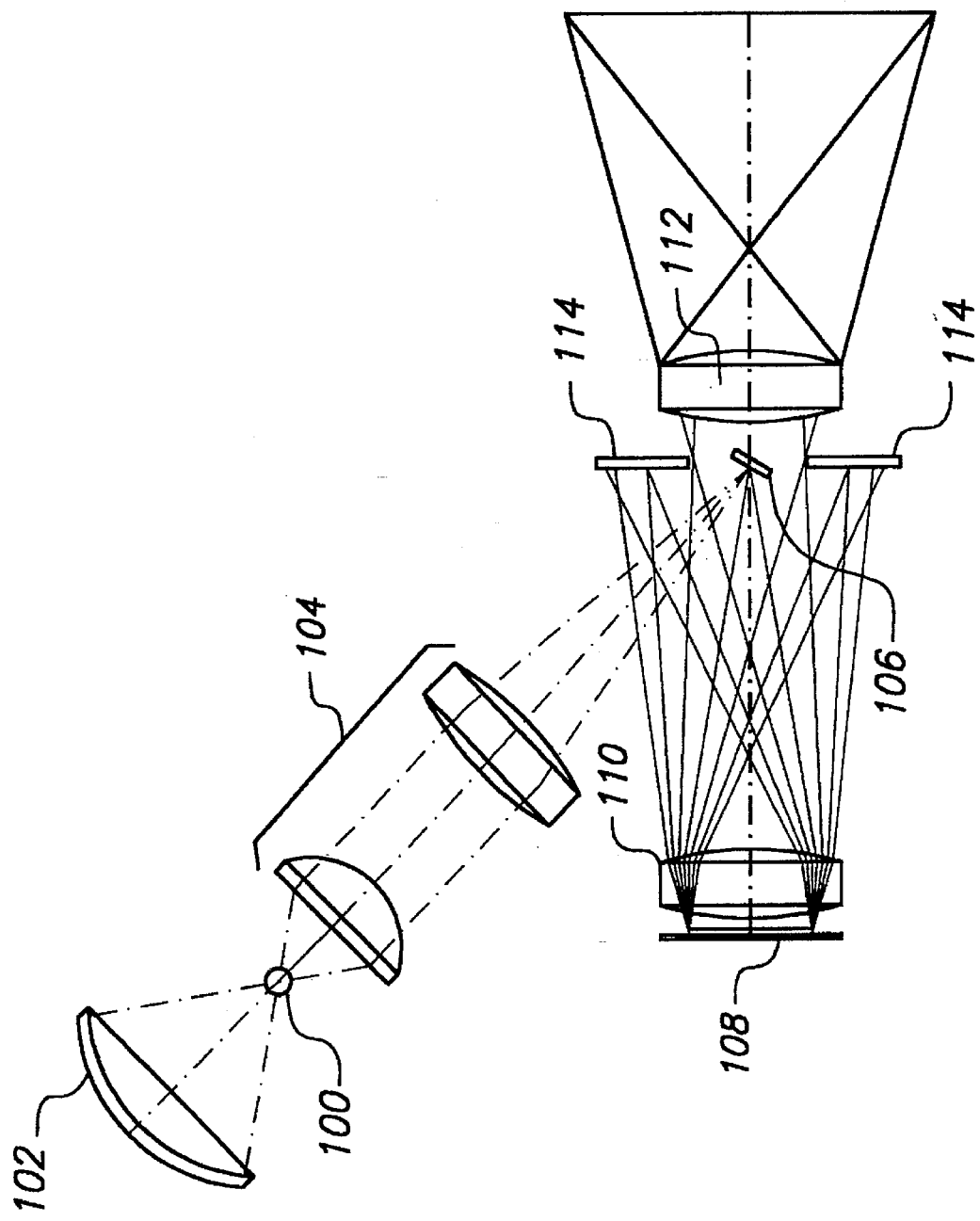
FIG. 1 shows a schematic diagram of a first optical system for a diffractive light valve system in the prior art.

In FIG. 1, light which neither strikes the mirror nor the condenser is lost. This wasted illumination accounts for lost efficiency of the system. The system according to the present invention provides two more collection devices to improve the efficiency of the system. These additional collection devices collect light which would otherwise be wasted. Returning to the description of FIG. 2, it can readily be seen that the second collection path is a mirror image of the first collection path. Each of these two collection paths collect light in each of two dimensions.

In the second collection path, a second spherical mirror 322 is collected and returned to the source 300 and passes thereby. Similarly, light which leaves the source 300 and strikes a first condenser system 324 is also collected, collimated, and imaged onto a turning mirror. The condenser 324 is a composite lens system including a first lens 326 to collimate the light, a turning mirror 328 to redirect the light and a second lens 330 to image the source 300 onto a subsequent turning mirror 332. The light which was collected by the mirror 322 also enters the condenser 324 after passing the source 300. The condenser 324 images its portion of the light from the source 300 onto a specular turning mirror 332. The turning mirror 332 reflects the light onto the reflective light valve 314 after passing through the Schlieren lens 316. A pupil mask 334 is included to block unwanted multiple order light.

Figure 3:
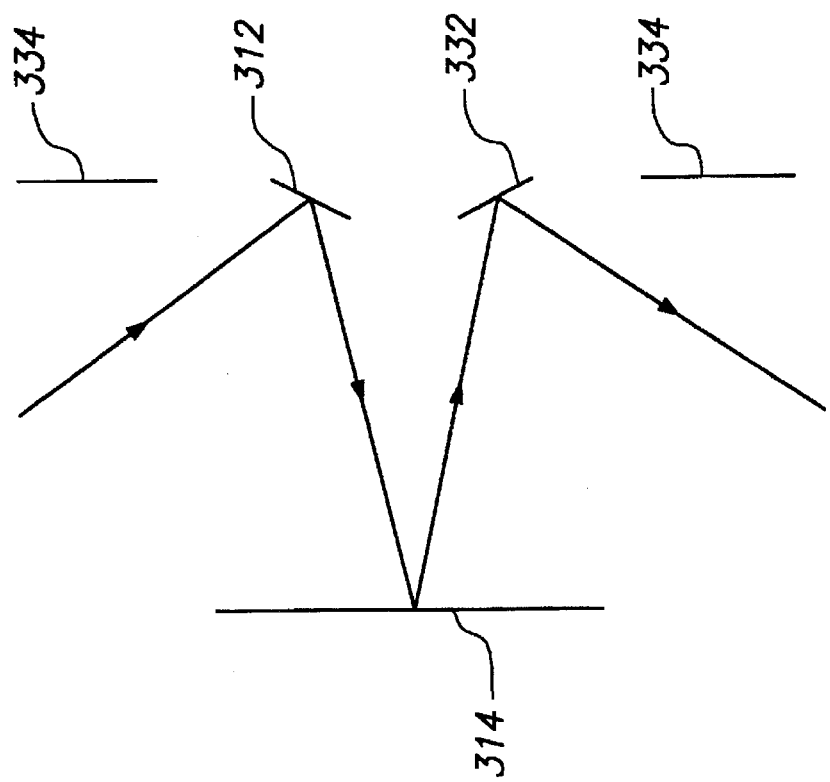
FIG. 3 shows a schematic representation of a portion of the optical system of the present invention when the valve is configured to be reflective.

FIG. 3 shows a schematic representation of the turning mirrors 312, 332, the valve 314 and the pupil mask 334 of FIG. 2. The Schlieren lens 316 is removed from the drawing to avoid obscuring the invention is additional detail. In FIG. 3, the valve is conditioned to be reflective. By way of example, light which impinges onto the first turning mirror 312 from the first collection path is reflected to strike the valve 314. In the reflective state, the valve 314 operates as a specular mirror. Accordingly, the light leaves the valve 314 at the same angle in which it arrives, and strikes the second turning mirror and is returned to the source through the second collection path. Because the two collection paths are identical, the light which impinges on the second turning mirror 332 from the second collection path, also reflects on the valve 314, to the first turning mirror 312 and thence back to the source. No light escapes the system.

Figure 4:
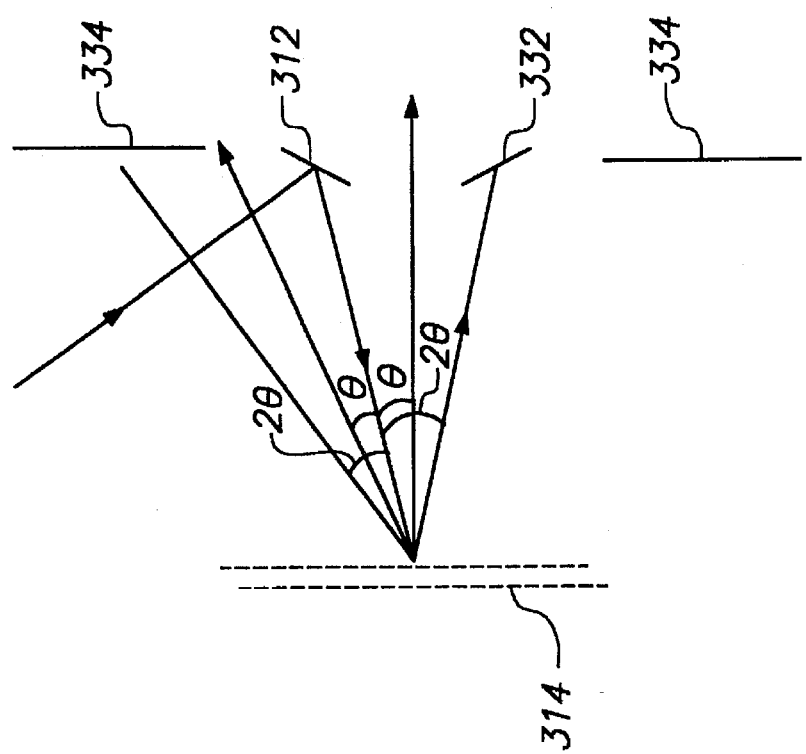
FIG. 4 shows a schematic representation of a portion of the optical system of the present invention when the valve is configured to be diffractive.

FIG. 4 shows the same elements as FIG. 3 except that the valve 314 is configured to diffract the light. As is well known, the valve 314 will diffract the light through angles of $\Theta$. The desired first order light which is diffracted through first order angle of $+/-\Theta$, will pass on either side of the turning mirror 312 as shown. This light will be collected by the projection optics 336 (FIG. 2).

The undesired second order light which is diffracted through an angle $+2\Theta$ will strike the second turning mirror 332 and return to the source. The second order light of angle $-2\Theta$ will strike the pupil mask 334 as shown. Half the third order light will exit the system and half will be blocked by the pupil mask. The undesired fourth and higher multiple order light of angle $+/-4\Theta$, $+/-5\Theta$ ... will also strike the pupil mask 334. Mirror images of these light paths provide light to the projection optics from the second collection path. In the second path, only first order light will be collected.

It is possible to break the turning mirrors into two or more sub-mirrors. These turning sub-mirrors can be located to appear as a single continuous reflective surface to light coming from the first and second condensers, respectively. These sub-mirrors can also be spaced apart along a different axis to appear a broken structure relative to diffracted light from the valve 314. Indeed, the sub mirrors can be positioned to allow first, third, fifth, and other odd orders of diffracted light and to concurrently block second, fourth, sixth and other even orders.

The design of the system is as follows. The diffraction angle of the light valve is given by the equation $$\sin(\Theta_d) = \lambda/\Lambda$$

where $\Theta_d$ is the angle of diffracted light, $\lambda$ is the wavelength of light, and $\Lambda$ is the grating period of the light valve.

Turning mirrors are placed at a horizontal distance f from the Schlieren lens and at vertical distances of $h=f \sin(\Theta_d)$ above and below at a line perpendicular to the light valve. By symmetry, each turning mirror acts as a stop for the specularly reflected light from the other turning mirror. When the valve is in the "on" state, meaning light is diffracted from the 0 order to high order modes, first and third order light is diffracted between and around the turning mirrors, but second order light is blocked by the turning mirrors or misses the projection lenses. Contrast ratios are improved by making the turning mirrors smaller and stopping light around them. For color operation, three light valves may be used to diffract red, green, and blue light. To obtain the maximum brightness, each of the light valves may be tuned to each of the respective colors. If the three light valves are tuned to one color only, the size of the stops behind the turning mirrors must be increased to block the second order light.

The present invention has been described relative to a preferred embodiment. Improvements or modifications that become apparent to persons of ordinary skill in the art only after reading this disclosure are deemed within the spirit and scope of the application.

What is claimed is:

1. An optical system comprising:
   a. a light source for generating light;
   b. a light valve for receiving light from the light source, wherein the light valve is selectably configurable to operate in each of a reflecting mode and a diffracting mode;
   c. means for collecting a first portion of the light in a first collection path;
   d. means for directing the first portion of the light to the light valve via the first collection path;
   e. means for collecting a second portion of the light in a second collection path; and
   f. means for directing the second portion of the light to the light valve via the second collection path, wherein the first portion of the light returns to the light source via the second path and the second portion of the light returns to the light source via the first path in the reflecting mode, and wherein first order diffractions of the first portion and the second portion of the light exit the system in the diffracting mode.

2. The optical system according to claim 1 wherein the light valve is a diffraction light valve.

3. The optical system according to claim 2 wherein the light valve is a grating light valve.

4. The optical system according to claim 2 wherein an angle of incidence is equal to a first order diffraction angle.

5. The optical system according to claim 2 wherein the means for directing the first portion of the light and the means for directing the second portion of the light comprise turning mirrors.

6. The optical system according to claim 5 wherein a second order diffraction is blocked by one of the turning mirrors.

7. The optical system according to claim 5 wherein the turning mirrors comprise a plurality of sub-mirrors which appear a single reflective surface to light traveling from the source to the light valve and appear a single reflective surface to light traveling from the light valve when the light valve is configured in the reflecting mode, and wherein odd order diffractions of the first portion and the second portion of the light exit the system when the light valve is configured in the diffracting mode.

8. The optical system according to claim 7 wherein an even order diffraction is blocked by a predetermined one of the turning mirrors.

* * * * *